United States Patent [19]

Sugano

[11] Patent Number: 4,867,014

[45] Date of Patent: Sep. 19, 1989

[54] ACCUMULATOR/FRICTION ELEMENT ARRANGEMENT FOR AUTOMATIC TRANSMISSION

[75] Inventor: Kazuhiko Sugano, Yokohama, Japan

[73] Assignee: Nissan Motor Co., Ltd., Yokohama, Japan

[21] Appl. No.: 264,829

[22] Filed: Oct. 31, 1988

[30] Foreign Application Priority Data

Oct. 30, 1987 [JP] Japan .................................. 62-273215

[51] Int. Cl.4 .............................................. B60K 41/16
[52] U.S. Cl. .......................................... 74/868; 74/867
[58] Field of Search .................................. 74/867, 868

[56] References Cited

U.S. PATENT DOCUMENTS

| | | | |
|---|---|---|---|
| 3,623,382 | 11/1971 | Chana | 74/864 |
| 3,842,693 | 10/1974 | Oberpichler | 74/868 X |
| 3,902,380 | 9/1975 | Murakami | 74/868 |
| 4,347,764 | 9/1982 | Lauven | 74/867 |
| 4,428,258 | 1/1984 | Kubo et al. | 74/867 |
| 4,722,250 | 2/1988 | Sumiya et al. | 74/867 |
| 4,722,251 | 2/1988 | Sumiya et al. | 74/867 X |
| 4,729,265 | 3/1988 | Sugano | 74/868 |
| 4,776,240 | 10/1988 | Miki | 74/867 X |

FOREIGN PATENT DOCUMENTS

61-165054 7/1986 Japan .

Primary Examiner—Dirk Wright
Attorney, Agent, or Firm—Foley & Lardner, Schwartz, Jeffery, Schwaab, Mack, Blumenthal & Evans

[57] ABSTRACT

The stroking order of the band brake servo piston and the accumulator piston are reversed under high and low transmission loads, therefore reversing the pressure modifying effects provided by the same. This is achieved by selecting the various areas and springs which determined the resistance against which the piston must stroke under high and low load conditions (wherein the level of the line pressure changes), and the forces which drive the pistons against the resistances.

10 Claims, 7 Drawing Sheets

FIG. 5a HYD. PRESS. (HIGH LOAD)

FIG. 5b OUTPUT SHAFT TORQUE

TIME ⟶

FIG. 6a HYD. PRESS. (LOW LOAD)

FIG. 6b OUTPUT SHAFT TORQUE

TIME ⟶

| | | R/C | H/C | F/C | O/C | B/B 2A | B/B 3R | B/B 4A | L&R/B | F/O | L/O | GEAR RATIO | α1 = 0.45, α2 = 0.45 |
|---|---|---|---|---|---|---|---|---|---|---|---|---|---|
| D RANGE | ENGINE DRIVING 1ST | | | ○ | | | | | | ○ | ○ | $\frac{1+\alpha_1}{\alpha_1}$ | 3.22 |
| | ENGINE DRIVING 2ND | | ○ | ○ | | | ○ | | | ○ | | $\frac{\alpha_1+\alpha_2+\alpha_1\alpha_2}{\alpha_1(1+\alpha_2)}$ | 1.69 |
| | ENGINE DRIVING 3RD | | ○ | ○ | ○ | | | | | ○ | | 1 | 1 |
| | ENGINE DRIVING 4TH | | | (○) | ○ | | | ○ | | | | $\frac{1}{1+\alpha_2}$ | 0.69 |
| | ENGINE BRAKING 1ST | | | (○) | ○ | ○ | | | | | | | |
| | ENGINE BRAKING 2ND | | ○ | (○) | ○ | ○ | ○ | | | | | | |
| | ENGINE BRAKING 3RD | | ○ | (○) | ○ | | | | | | | | |
| | ENGINE BRAKING 4TH | | | (○) | | | | ○ | | | | | |
| 2ND RANGE | 1ST | | | ○ | | | ○ | | | ○ | ○ | | |
| | 2ND | | | ○ | | ○ | ○ | | | ○ | | | |
| 1ST RANGE | 1ST | | | ○ | | | | | ○ | ○ | | | |
| REVERSE | | ○ | | | | | | | ○ | | | $-\frac{1}{\alpha_2}$ | −2.22 |

( ) UNRELATED TO POWER TRANSMISSION

ACCUMULATOR/FRICTION ELEMENT ARRANGEMENT FOR AUTOMATIC TRANSMISSION

BACKGROUND OF THE INVENTION

1. Field of the Invention

The present invention relates to an automatic transmission and more specifically to an accumulator/friction element arrangement for such a transmission which improves the shift characteristics of the same.

2. Description of the Prior Art

JP-A-61-165054 discloses an automatic transmission arrangement wherein two friction elements (a high clutch and a band brake) are arranged to be controlled by a single shift valve. That is to say, with this arrangement when the shift valve assumes an upshift position the clutch is supplied with hydraulic fluid in a manner to induce the same to engage while the release chamber of the band brake servo is pressurized in a manner wherein it is conditioned to assume a released position.

An orifice is arranged in the conduiting interconnecting the shift valve and the above mentioned friction elements in a manner to restrict the communiction therebetween. An accumulator is also connected with the conduiting arrangement in a manner to communicate with the same at a location between the friction elements and the shift valve. This accumulator is arranged to maintain the pressure in the conduiting at an essentially constant level during the charge stroke thereof and thus reduce shift shock during an upshift.

However, this arrangement has suffered from the drawback that when the throttle opening is relatively large the band brake response is not sufficiently quick during upshifts. That is to say, the accumulator is arranged to, during its charging stroke, modify the pressure in a manner which slows the development of the pressure in the band brake servo release chamber and which acts against that supplied to an apply chamber. Accordingly, at the final stage of shift the accumulator modifies the pressure development with the result that the torque which is transmitted by the band brake is insufficiently reduced and the shift feeling is deteriorated.

In connection with the above problem, when the throttle opening is on the high side, the level of the line pressure also increases. Accordingly, the point at which the release of the band brake is achieved is determined by the point at which engagement pressure is neutralized by the release pressure. However, when the line pressure is high, the engagement pressure is also high and the release pressure must be raised to a relatively high level before the brand brake can be induced to assume a released condition. However, when the throttle opening is large the throttle pressure developed in the system is increased with the result that the level of line pressure also increases.

In order to overcome this problem it is possible to set the level of the pressure which is maintained by the accumulator higher than the pressure required to release the band brake and thus ensure that the band brake will be released before the accumulator begins to stroke.

While it is possible using the above mentioned technique possible to overcome the delayed band brake release problem a secondary drawback is induced that the band brake tends to be released excessively quickly and invites engine racing.

That is to say, when the throttle opening (pressure) is small the level of the line pressure which is supplied is also reduced with the result that the pressure at which the band brake releases is also reduced. In addition, if the accumulator is arranged to stroke after the pressure has risen to a relatively high level (and therefore temporarily maintain the pressure essentially at this level), the provision of the accumulator tends to be lost as the release pressure is developed before the accumulator actually begins to produce its pressure modifiying effect. Moreover, the engagement timing of the high clutch is essentially uneffected by the level of the line pressure and is essentially fixed.

SUMMARY OF THE INVENTION

It is an object of the present invention to provide an accumulator/friction element arrangement which enables the engagement timing of one of two friction elements to be changed during upshifts in response to the level of torque being tranmitted through the transmission in a manner which improves the shift feeling.

In brief, the above object is achieved by an arrangement wherein the stroking order of the band brake servo piston and the accumulator piston are reversed under high and low transmission loads, therefore reversing the pressure modifying effects provided by the same. This is achieved by selecting the various areas and springs which determined the resistance against which the piston must stroke under high and low load conditions (wherein the level of the line pressure changes), and the forces which drive the pistons against the resistances.

More specifically, a first aspect of the invention is deemed to comprise a transmission which features: a friction element, the friction element having a first element disposed in a release chamber, the first element being arranged to, when hydraulic fluid is supplied from a shift valve into the release chamber, stroke from an engaged position to an unengaged one against a first bias which varies with the load applied to the transmission, the stroking of the element modifying the pressure prevailing in the release chamber; and an accumulator in fluid communication with the release chamber of the first friction element, the accumulator having a second element which strokes against a second bias which varies with the load applied to the transmission when hydraulic fluid is supplied from the shift valve, the stroking of the second element modifying the pressure prevailing in the release chamber, the friction element and the accumulator being so constructed and arranged that under high load the first element is induced to stroke before the second element and under low load the second element is induced to stroke before the first element.

A second aspect of the present invention is deemed to comprise a transmission which features: a friction element, the friction element having a first piston disposed in a release chamber, the first piston being arranged to stroke from an engaged position to an unengaged one against a first bias when hydraulic fluid is supplied from a shift valve into the release chamber, the stroking of the first piston producing a first modifying effect on the pressure prevailing in the release chamber; and an accumulator in fluid communication with the release chamber of the first friction element, the accumulator having a second piston which strokes against a second bias which varies with the pressure prevailing in a back pressure chamber to which the second piston is exposed, the stroking of the second piston producing a second modifying effect on the pressure prevailing in the release chamber; a control valve, the control valve being responsive to the load on the transmission in manner to vary the level of the hydraulic fluid presure discharge therefrom, the control valve being fluidly connected with the back pressure chamber.

A third aspsect of the present invention is deemed to comprise a transmission which features: a shift valve, the shift valve having a port which is supplied with hydraulic fluid when the valve assumes a first position and which is drained when the valve assumes a second position; a first friction element, the first friction element being fluidly communicated with the port of the shift valve by conduit means and arranged to engaged when supplied with hydraulic fluid from the shift valve through the conduit means; a second friction element, the second friction element comprising: a servo piston, the servo piston being disposed in a bore in a manner to define a release chamber and an apply chamber, the servo piston having a first pressure responsive area exposed to the release chamber and a second pressure responsive area exposed to the apply chamber, the first area being larger than the second area, the release chamber being fluidly communicated with the port of the shift valve by the conduit means, the servo piston being arranged to produce a first pressure modifying effect on the pressure prevailing in the release chamber as it strokes from an engaged position to a released one against the bias of the hydraulic fluid pressure which is supplied to the apply chamber; an accumulator, the accumulator being fluidly communicated with the port of the shift valve by the conduit means, the accumulator being arranged to produce a second pressure modifying effect on the pressure prevailing in the release chamber as it charges with hydraulic fluid, the first friction element and the accumulator being so constructed and arranged so that when when the load on the transmission is high and low, the first pressure modifying effect is greater than and less than respectively, the second pressure adjusting effect.

A fourth aspect of the instant invention is deemed to comprise a hydraulic control circuit of an automatic transmission which hydraulic control circuit features: a shift valve, the shift valve being fluidly communicated with a source of hydraulic fluid under pressure; a first friction element, the first friction element being fluidly communicated with the shift valve by conduit means and arranged to engaged when supplied with hydraulic fluid from the shift valve through the conduit means; a second friction element, the second friction element comprising: a servo piston, the servo piston being disposed in a bore in a manner to define a release chamber and an apply chamber, the servo piston having a first pressure responsive area exposed to the release chamber and a second pressure responsive area exposed to the apply chamber, the first area being larger than the second area, the release chamber being fluidly communicated with the shift valve by the conduit means, the servo piston being arranged to produce a first pressure modifying effect on the pressure prevailing in the release chamber as it strokes from an engaged position to a released one against the bias of the hydraulic fluid pressure which is supplied to the apply chamber; an accumulator, the accumulator being fluidly communicated with the shift valve by the conduit means, the accumulator being arranged to produce a second pressure modifying effect on the pressure prevailing in the release chamber as it charges with hydraulic fluid, the first friction element and the accumulator being so constructed and arranged so that when the load on the transmission is high and low, the first pressure modifying effect occurs respectively before and after the second pressure adjusting effect.

A fifth aspect of the present invention is deemed to comprise a transmission which features: a shift valve, the shift valve having a port which is supplied with hydraulic fluid when the valve assumes a first position and which is drained when the valve assumes a second position; a first friction element, the first friction element being fluidly communicated with the port of the shift valve by conduit means and arranged to engaged when supplied with hydraulic fluid from the shift valve through the conduit means; a second friction element, the second friction element comprising: a servo piston, the servo piston being disposed in a bore in a manner to define a release chamber and an apply chamber, the servo piston having a first pressure responsive area exposed to the release chamber and a second pressure responsive area exposed to the apply chamber, the first area being larger than the second area, the release chamber being fluidly communicated with the port of the the shift valve by the conduit means, the servo piston being arranged to produce a first pressure adjustment effect on the pressure prevailing in the release chamber as it strokes from an engaged position to a released one against the bias of the hydraulic fluid pressure which is supplied to the apply chamber; an accumulator, the accumulator being fluidly communicated with the port of the shift valve by the conduit means, the accumulator having an accumulator piston which is arranged to stroke in a charging direction to produce a second pressure adjustment effect on the pressure prevailing in the release chamber as the accumulator fills with hydraulic fluid, the accumulator piston being exposed to a back pressure chamber; and a pressure control valve, the pressure control valve being responsive to the load on the transmission in a manner to modify the level of the pressure supplied to the back pressure chamber and to modify the bias which resists the stroking of the piston in the charging direction.

A further aspect of the present invention is deemed to comprise a transmission which features: a source of line pressure; a source of throttle pressure which varies with the load on the transmission; a first friction element which when engaged conditions the transmission to produce a nth gear ratio; a second friction element which when engaged produces a n-lth gear ratio, the second friction element being disengaged to permit the transmission to produce the nth gear ratio, the second friction element having an apply chamber, a release chamber, a servo piston exposed to both of the apply and release chambers and a first spring disposed in the release chamber, the apply and release chambers being arranged so that when the release chamber is supplied with line pressure, the servo piston is moved toward a released position irrespective of the supply of line pressure into the apply chamber, a shift valve, the shift valve being fluidly communicated with the source of line pressure and with the first friction element and the release chamber; an accumulator, the accumulator being fluidly communicated with the release chamber, the accumulator having an accumlator piston which is disposed in a stepped bore in manner to define a working chamber and a back pressure chamber, the accumulator including a spring which is disposed in the working chamber; the second friction element and the accumulator being so constructed and arranged so that when the load on the transmission is high and line pressure is supplied from the shift valve to the first friction element, the release chamber of the second friction element and the working chamber of the accumulator, the servo piston strokes toward its released position before the accumulator piston strokes under the filling of the working chamber, and so that when the load on the transmission is low and line pressure is supplied to the first friction element, the release chamber of the second friction element and the working chamber of the accumulator, the accumulator piston strokes under the filling of the working chamber before the servo piston strokes toward its released position, the stroking of the servo piston and the accumulator piston producing first and second pressure modifying effects respectively.

DETAILED DESCRIPTION OF THE PREFERRED EMBODIMENTS

Figure 2:
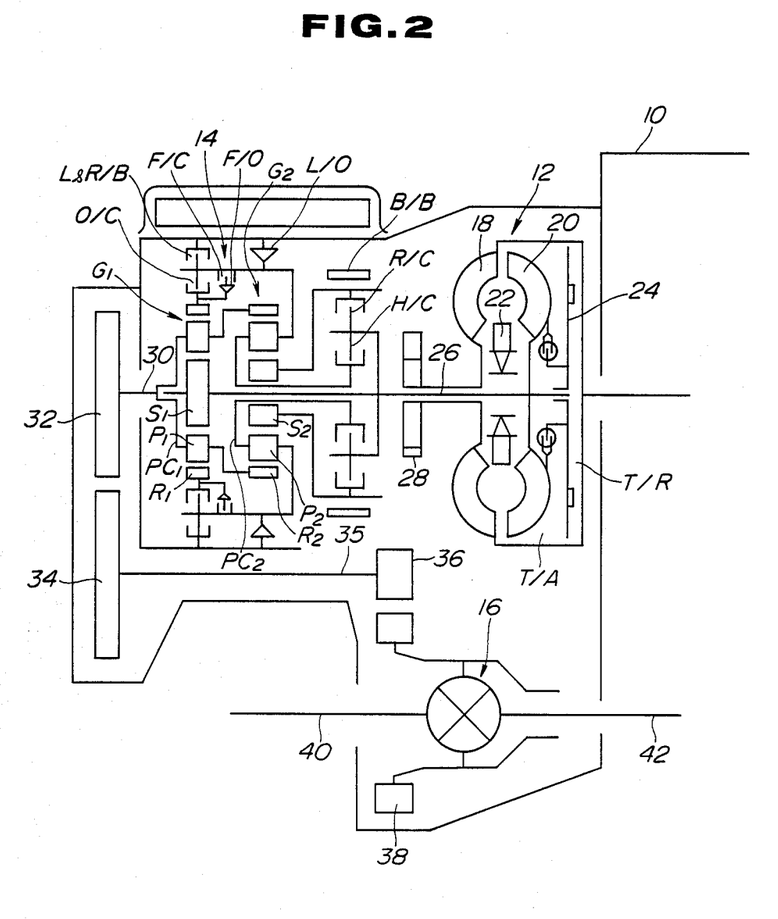
FIG. 2 is a schematic elevation showing a transaxle of the type to which the embodiment of the present invention can be applied.

FIG. 2 shows in schematic elevational form, an automatic transaxle which includes a torque converter 12, a planetary gear train and a differential or final drive unit 16. This unit is arranged traversely across the vehicle chassis and is connected to an engine 10 at one end thereof. The torque converter (T/C) in this instance includes a pump impeller 18, turbine runner 20, stator 22 and a lock-up clutch 24. With this arrangement when the lock-up clutch 24 is disengaged torque from the engine crankshaft (no numeral) is supplied by way of the pump impeller 18 to a transmission input shaft 26. However, upon engagement of the lock-up clutch 24 the torque is supplied directly to the input shaft 26.

In this transaxle the lock-up clutch 24 is arranged to be responsive to the pressure differential which exists between an apply chamber A/T and a release chamber T/R. It should be noted that an oil pump 28 which outputs pressurized hydraulic fluid is arranged to be driven by the T/C.

The planetary gear train includes first and second gear units G1, G2. The first unit G1 includes a sun gear S1, an internal or ring gear R1 and pinion gears P1 which mesh with the ring and sun gears. The pinion gears are of course are rotatably disposed on a pinion carrier PC1. The second unit G2 similarly includes a sun gear S2, a ring gear R2, pinion gears P2 and a carrier PC2.

The sun gear S1 of the first unit G1 is connected to the input shaft 26 in a manner to undergo synchronous rotation therewith while pinion carrier PC1 and the ring gear R2 of the second unit G2 are connected with a transmission output shaft 30. The ring gear R1 of the first unit G1 is selectively connectable with carrier PC2 by way of the forward one-way cluch F/O and the overrunning clutch O/C. Sun gear S2 is selectively connectable with the input shaft 26 by way of the reverse clutch R/C while the pinion carrier PC2 is arranged to be connectable with the same via a high clutch H/C.

Sun gear S2 can be selectively rendered stationary via the application of a band brake B/B while the pinion carrier PC2 is operatively connected with the parallel low one-way clutch L/O and low and reverse brake L&R/B in a manner which enables the same to be selective held stationary.

An output gear 32 is fixed to one end of the output shaft 30 and arranged to mesh with an idler ger 34. The latter mentioned gear is fixed to one end of a idler shaft 35 which extends parallel to the input shaft 26 and passes back through the transmission as shown. A reduction gear 36 is provided at the inboard end of the idler shaft 35. This gear meshes with a ring gear 38 of the differential unit 16.

Torque is delivered to the wheels of the vehicle by way of stub shafts 40 and 42. In this instance the shafts 40 and 42 are respectively connected with the forward left and right hand wheels of the vehicle.

Figure 8:
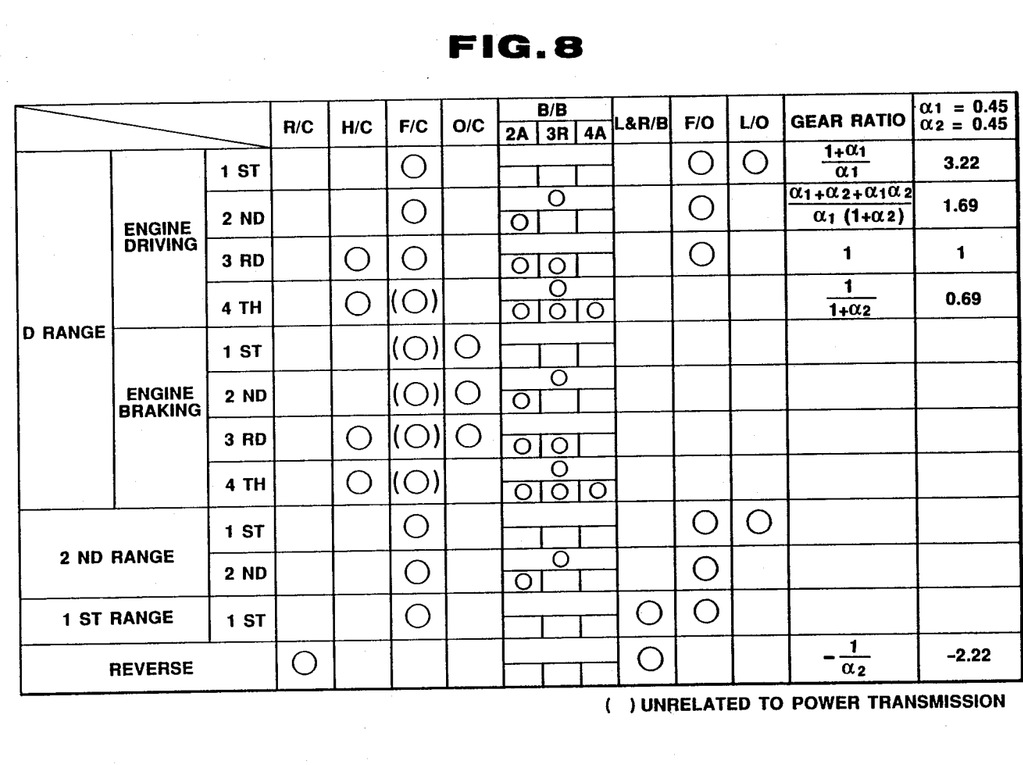
FIG. 8 is a table showing the relationship between the friction element engagement and the gear ratios produced by the arrangement shown in FIGS. 2 and 3.

With the above described arrangement selective engagement and/or use of the clutches F/C, H/C, O/C, R/C, the brakes B/B and L&R/B and the one-way clutches F/O and L/O it is possible to condition the first and second planetary gear units G1 and G2 to produce four forward and one reverse gear ratios in the manner as depicted in the table shown in FIG. 8.

It should be noted that in this table the circles denote the engagement of an element and or the use of a one-way clutch. In this transmission the engagement of the band brake B/B is controlled by a servo having first, second and third chambers. That is, a second speed apply chamber 2A, a third speed release chamber 3R and a fourth speed apply chamber 4A. In connection with these chambers the circular indicia in Table 1 indicate the chamber being applied with hydraulic pressure. Further, in this table alpha 1 and alpha 2 indicate the ratios of the teeth on the ring gears R1 and R2 and the corresponding sun gears S1 and S2, respectively. The gear ratio defined in Table 1 denote the ratios defined between the rotational speeds of the output and input shafts 30, 26.

With the above described transmission arrangement rotational power or torque is transferred via the gear train from the input shaft 26 to the output shaft 30 and to the final drive or differential unit 16 by way of the output gear 30, the idler gear 34, reduction gear 36 and the ring gear 30. In fourth speed an overdrive condition is established.

Figure 1:
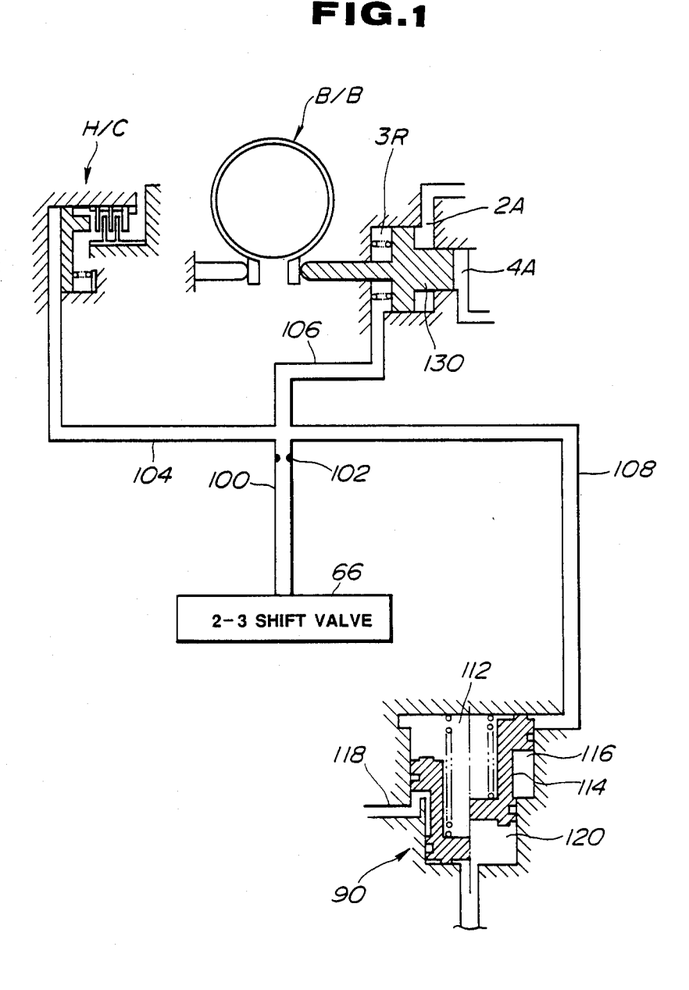
FIG. 1 is a schematic sectional view showing the arrangement of a shift valve, accumulator and friction elements according to the present invention.

In order to control the above described gear train the hydraulic spool valve system of the nature shown in FIG. 1 is used.

This system includes a pressure regulator valve 50, a manual valve 52, a throttle valve 54, a throttle modifier valve 58, a lock-up control valve 60, a governor valve 62, a 1-2 shift valve 64, a 2- 3 shaft valve 66, a 3-4 shift valve 68, a 3-2 timing valve 70, a 4-2 sequence valve 72, a fixed first speed pressure reducing valve 74, a speed cut-back valve 76, an overrunning clutch control valve 78, a 1-2 accumulator valve 80, a kickback modifier valve 83, an N-D accumulator 88 and a servo release accumulator 90.

FIRST EMBODIMENT

Figure 3:
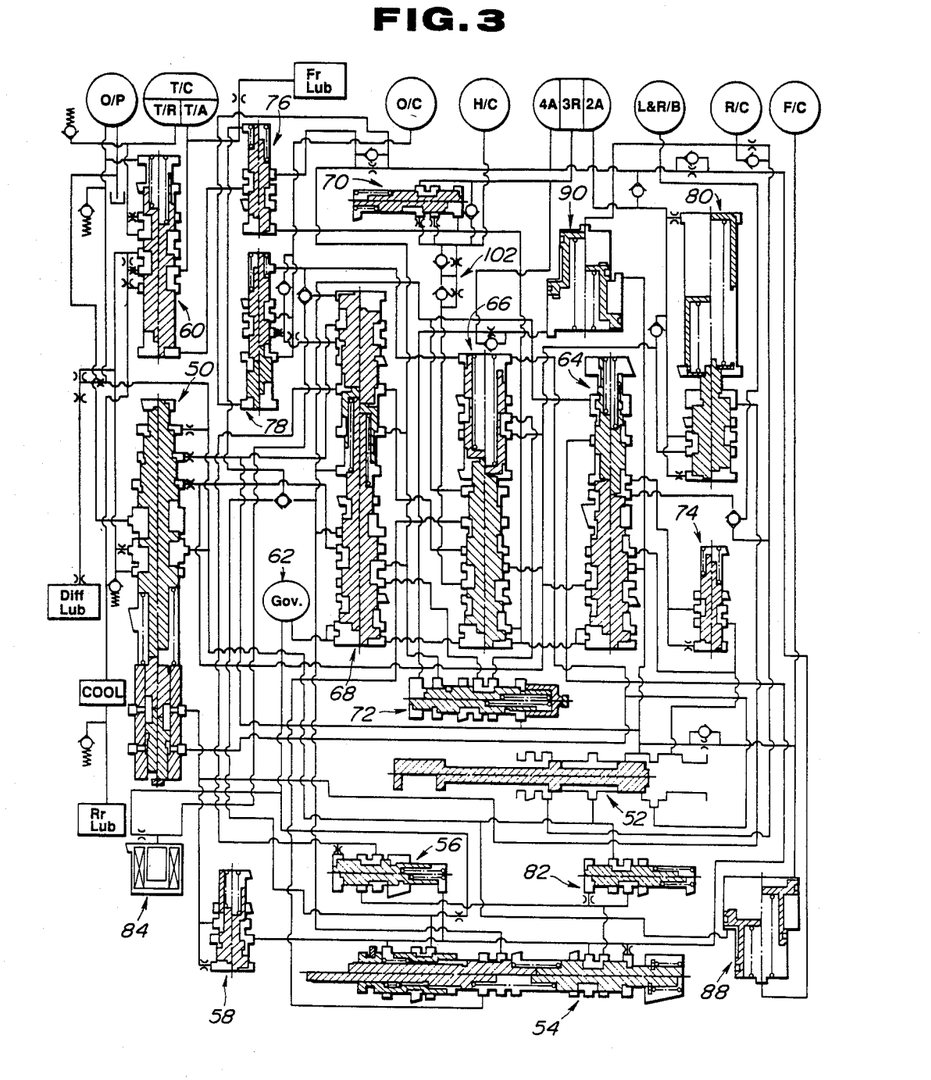
FIG. 3 is a schematic sectional plan view showing a control circuit of the type which is used to control the transmission of the transaxle arrangement shown in FIG. 2 and which incorporates a first embodiment of the present invention.

FIG. 1 shows an arrangement which embodies the present invention. A comparison with FIG. 3 will indicate that the arrangement shown in FIG. 1 is a simplication of the circuit arrangement actually used. However, it is to be appreciated that this drawing has been simplified in order to remove valves and conduiting arrangement which are not directly involved with the present invention and to increase the ease of understanding of the features and arrangements which characterize the same.

The 2-3 shift valve 66 is arranged in a manner to be conventionally responsive to the levels of the governor pressure and the throttle pressure. Upon the load and speed signals obtaining a predetermined relationship, the swift valve 66 is arranged to move from a downshift position and assume one which induces an upshift and conditions the transmission to produce a third speed gear ratio. In the downshift position shift valve 66 is such to connect conduit 100 to drain while in the upshift position is arranged to supply line pressure into said conduit.

An orifice 102 is disposed in the conduit 100 and arrange to restrict the fluid communication between conduit 100 and conduits 104, 106 and 108. It will be noted that in this embodiment the orifice is arranged to restrict fluid flow in both directions. However, it is within the scope of the present invention to replace this single fixed orifice with two one-way orifices which are arranged in the manner illustrated in FIG. 3.

As shown, conduit 140 leads to a high clutch H/C, while conduits 106 and 108 communicate with the third speed release chamber 3R of the band brake B/B and a servo release accumulator 90.

The servo release accumulator 90 comprises a stepped piston which is reciprocatively disposed in a stepped bore. The piston includes a large diameter land a small diameter one. These lands engage the walls of the stepped bore in a manner to define first, second and third chambers 112, 116 and 120. The first chamber 112 is arranged to communicate with conduit 108 while the second annular chamber 116 is arranged to communicate with a conduit 118 in manner to be supplied with a suitable back pressure while the transmission is conditioned to produce any forward speed. In this instance line pressure is utilized as the back pressure. The third chamber 120 is normally drained and supplied with line pressure only when the transmission is conditioned to produce reverse gear. A spring is disposed in first chamber and arranged to bias the piston 114 in a direction which tends to minimize the volume of the third chamber.

Figure 4:
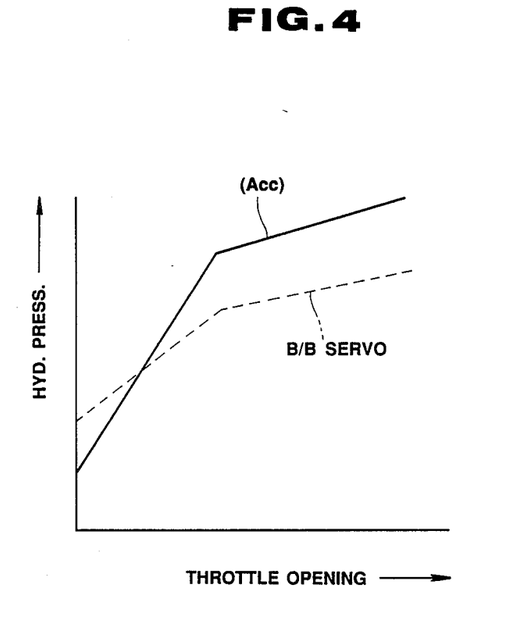
FIG. 4 is a table which shows in terms of hydraulic pressure and throttle opening, the pressure control characteristics which are provided by the servo release accumulator and the band brake servo in accordance with the present invention.

In FIG. 4 the solid line trace shows the pressure response characteristics provided by the servo release accumulator while the broken line one shows the pressure control characteristics provided by the servo piston of the band brake B/B. Viz., as will be appreciated the stroking of the servo piston provides a pressure modifying effect similar to that provided by the accumulator and tends to have a levelling effect on the pressure development. However, the area against which pressure acts and the strength of the forces which resist the movement of the servo release accumulator accumulator piston and the band brake servo piston are, in accordance with the present invention, arranged such that the two traces intersect at a given throttle opening. Viz., at low throttle settings the pressure modification characteristics provided by the accumulator initiate at a pressure which is lower than those produced by the band brake servo piston. However, the rate at which the accumulator pressure characteristics increase with respect to throttle opening is higher than that induced by the servo piston and accordingly the two traces intersect.

OPERATION

The operation of the above described embodiment is as follows:

HIGH LOAD UPSHIFT

Figure 5A:
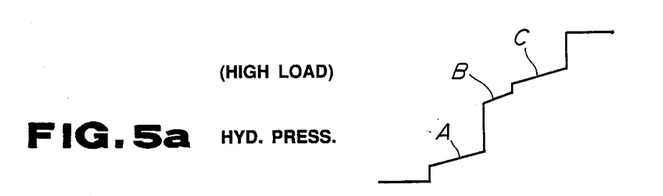
FIGS. 5 and 6 are timing charts showing the relation developed between the friction element timing and the torque applied to the output shaft of the transmission under high and low torque conditions respectively.
Figure 5B:
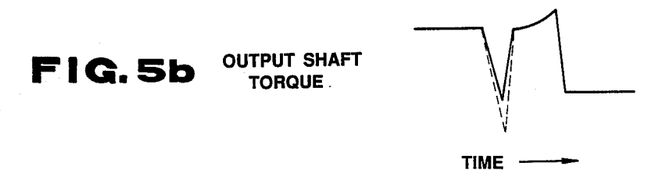

When a 2-3 upshift occurs uner high throttle and line pressure conditions line pressure is supplied into conduit 100 and is supplied to the high clutch H/C and the third speed release chamber 3R of the band brake B/B in a manner which induces the engagement of the high clutch and the release of the band brake. Under these conditions the pressure which is supplied to the third speed release chamber 3R and the high clutch H/C varies in the manner illustrated in FIG. 5(a). As shown, the piston of the high clutch H/C is induced to stroke and produce first pressure levelling effect as indicated by stage A. Following this, the servo piston of the band brake is induced to stroke and produces a second pressure levelling as shown by stage B. After this, the servo release accumulator piston 114 is induced to undergo its charging stroke and induce the pressure leveling stage C. Upon completion of this latter mentioned stroke the pressure rises sharply to line pressure level.

As will be clear from FIG. 4, the above pressure development occurs under high throttle settings wherein the pressure adjustment provided by the accumulator occurs at a higher pressure than that provided by the stroking of the servo piston. In other words, under these conditions, the stroking of the accumulator will not occur until after that of the servo piston has taken place. This causes the torque which applied to the output shaft to vary in the manner shown in FIG. 6(b). Viz., the torque is controlled in a manner wherein it is prevented from undergoing an excessive reduction as is apt to occur with the prior art arrangement (shown in broken line) and a sharp braking sensation is prevented from being generated.

LOW LOAD UPSHIFT

On the other hand, when the transmission is being operated under low torque conditions (viz., the throttle opening, throttle and line pressures are low) the relationship between the pressure control provided by the accumulator and by the band brake become reversed. Viz., when the throttle opening does not exceed the value at which the two traces intersect (FIG. 4) the servo release accumulator piston 114 is more readily biased to move than the band brake servo piston. Accordingly, after the stroking of the high clutch a the servo release accumulator piston undergoes its charging stroke C'. This is then followed by the stroking of the band brake servo piston B'. Thus, as will be understood the complete release of the band brake occurs later than under the high throttle opening conditions.

Figure 6A:
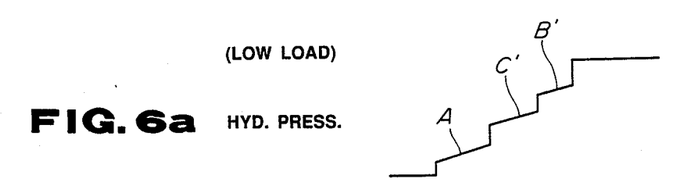
Figure 6B:
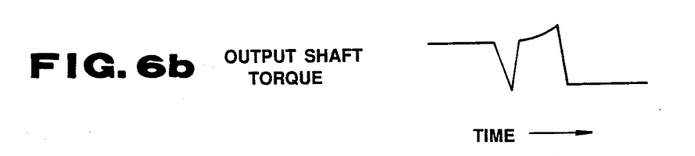

The engagement characteristics of the band brake are therefore modified and the torque applied to the output shaft of the transmission varies in the manner indicated in FIG. 6(b). Viz., under these conditions the amount of torque which is being transmitted by the band brake is small as compared with the above mentioned high torque transmission conditions and the line pressure which supplied to apply the same is relatively low, the delayed release provides a suitable degree of locking of the transmission and provides a braking effect within the transmission which obviates engine racing.

In order to achieve the above operation, it is necessary to ensure that:

$$SA/SR < 1$$

$$SA/SR < FsAcc / SAcc$$

$$PAcc = FsAcc / SAcc$$

$$PS/R = SA/SR + FSS/R/SR$$

wherein:
FSS/R denotes the spring constant of the of the spring disposed in the 3R chamber;
SA denotes the effective area of the band brake servo piston exposed to the apply chamber 2A;
SR denotes the effective area of the band brake servo piston which is exposed to the release chamber 3R;
FsAcc denotes the spring constant of the spring disposed in chamber 112;
SAcc denotes the area of the accumulator piston 114 acted on by the back pressure (line pressure) in chamber 116;
PAcc denotes the pressure control provided by the accumulator; and
PS/R denotes the pressure control provided by the servo piston.

SECOND EMBODIMENT

Figure 7:
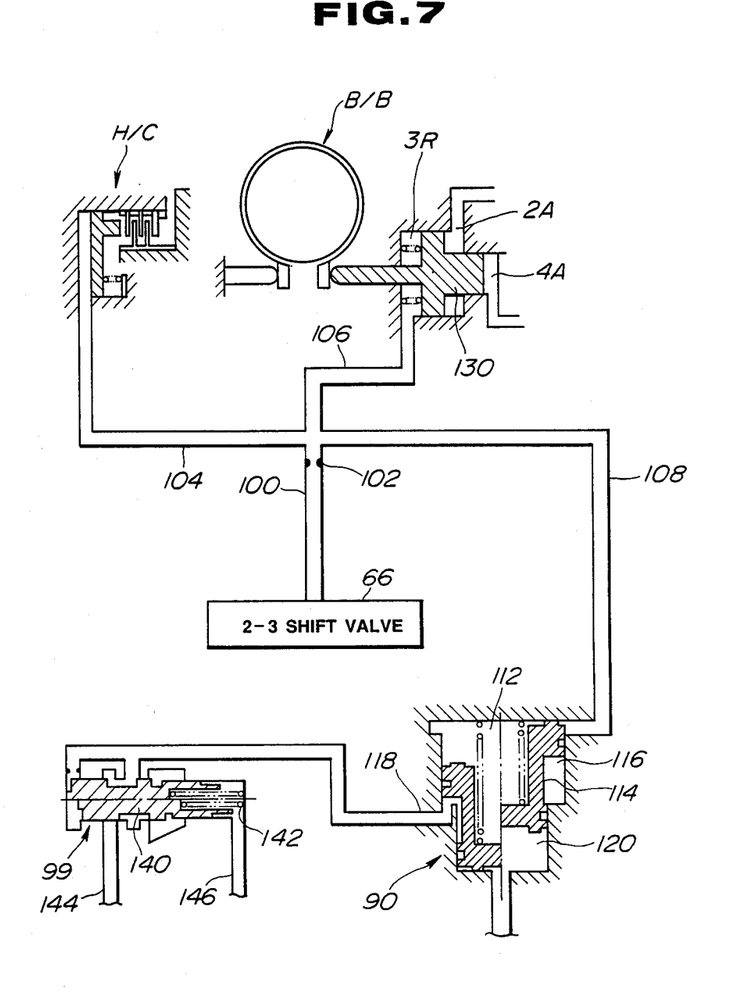
FIG. 7 is a schematic sectional view showing a second embodiment of the present invention.

FIG. 7 shows a second embodiment of the present invention. In this arrangement the back pressure which is supplied to the servo release accumulator by way of conduit 118 is controlled via the provision of a back pressure control valve 99. The valve includes a spool 140 and a spring 142 which are arranged in the illustrated manner. A conduit 144 provides fluid communication between a source of line pressure while a second conduit 146 which fluidly communicates with the chamber in which spring 142 is disposed is supplied with throttle pressure. This valve is therefore arranged to modify the pressure which is supplied to chamber 116 of the servo release accumulator in accordance with the torque which is applied to the transmission. Accordingly, with this arrangement as the back pressure which resists the stroking of the servo release accumulator piston 114 lowers with the lowering of the throttle pressure, the stroking of the same can be more readily induced at low throttle setting and the reversal of the stroking order of the servo release accumulator and the band brake servo readily induced and permit a greater degree in design feedom in that variious changes in piston diameter, spring constant and the like can be made which are not possible with the first embodiment.

What is claimed is:
1. In a transmission
   a fraction element, said friction element having a first element disposed in a release chamber, said first element being arranged to, when hydraulic fluid is supplied from a shift valve into said release chamber, stroke from an engaged position to an unengaged one against a first bias which varies with the load applied to the transmission, the stroking of said element modifying the pressure prevailing in said release chamber; and
   an accumulator in fluid communication with the release chamber of said first friction element, said accumulator having a second element which strokes against a second bias which varies with the load applied to said transmission when hydraulic fluid is supplied from the shift valve, the stroking of said second element modifying the pressure prevailing in said release chamber, said friction element and said accumulator being so constructed and arranged that under high load said first element is induced to stroke before said second element and under low load said second element is induced to stroke before said first element.

2. A transmission as claimed in claim 1 further comprising a second friction element, said second friction element being fluidly communicated with said release chamber and having a third element which moves from an unengaged position to an enaged one in response to hydraulic fluid being supplied thereto from the shift valve, said second friction element being arranged so that said third element moves to said engaged position in response to the supply of hydraulic fluid from said shift valve before either said first and second elements are induced to stroke.

3. In a transmission
   a friction element, said friction element having a first piston disposed in a release chamber, said first piston being arranged to stroke from an engaged position to an unengaged one against a first bias when hydraulic fluid is supplied from a shift valve into said release chamber, the stroking of said first piston producing a first modifying effect on the pressure prevailing in said release chamber; and
   an accumulator in fluid communication with the release chamber of said first friction element, said accumulator having a second piston which strokes against a second bias which varies with the pressure prevailing in a back pressure chamber to which said second piston is exposed, the stroking of said second piston producing a second modifying effect on the pressure prevailing in said release chamber;
   a control valve, said control valve being responsive to the load on said transmission in manner to vary the level of the hydraulic fluid presure discharge therefrom, said control valve being fluidly connected with said back pressure chamber.

4. A transmission as claimed in claim 3 wherein said first bias is produced by the pressure prevailing in an engage chamber of said first friction element.

5. A transmission as claimed in claim 4 wherein
   said engage chamber is fluidly communicated with said control valve and wherein said control valve is a pressure regulator valve which modifies the discharge of a pump; and wherein
   said friction element and said accumulator are so constructed and arranged that under high load said first piston is induced to stroke before said second piston and under low load said second piston is induced to stroke before said first piston.

6. A transmission as claimed in claim 4 further comprising a source of line pressure and a source of throttle pressure which is indicative of the load on said transmission and wherein said engage chamber is fluidly communicated with said source of line pressure and wherein said control valve is fluidly communicated with line pressure source and said throttle pressure source, said control valve comprising:
- a spool, said spool being reciprocatively disposed in a bore in a manner to define a first chamber at one thereof and a second chamber at the other end thereof;
- spring, said spring being disposed said first chamber, said spring being arranged to bias said spool in a first direction, said first chamber being fluidly communicated with said source of throttle pressure,
- an inlet port fluidly communicated with said source of line pressure;
- an outlet port fluidly communicated with said back pressure chamber, the communication between inlet and outlet ports increasing as said spool moves in said first direction, said outlet port being fluidly communicated with said second chamber.

7. In a transmission
- a shift valve, said shift valve having a port which is supplied with hydraulic fluid when said valve assumes a first position and which is drained when said valve assumes a second position;
- a first friction element, said first friction element being fluidly communicated with the port of said shift valve by conduit means and arranged to engaged when supplied with hydraulic fluid from said shift valve through said conduit means;
- a second friction element, said second friction element comprising:
  - a servo piston, said servo piston being disposed in a bore in a manner to define a release chamber and an apply chamber, said servo piston having a first pressure responsive area exposed to said release chamber and a second pressure responsive area exposed to said apply chamber, said first area being larger than said second area, said release chamber being fluidly communicated with the port of said shift valve by said conduit means, said servo piston being arranged to produce a first pressure modifying effect on the pressure prevailing in said release chamber as it strokes from an engaged position to a released one against the bias of the hydraulic fluid pressure which is supplied to said apply chamber;
  - an accumulator, said accumulator being fluidly communicated with the port of said shift valve by said conduit means, said accumulator being arranged to produce a second pressure modifying effect on the pressure prevailing in said release chamber as it charges with hydraulic fluid, said first friction element and said accumulator being so constructed and arranged so that when when the load on said transmission is high and low, the first pressure modifying effect is greater than and less than respectively, said second pressure adjusting effect.

8. In the hydraulic control circuit of an automatic transmission:
- a shift valve, said shift valve being fluidly comunicated with a source of hydraulic fluid under pressure,
- a first friction element, said first friction element being fluidly communicated with said shift valve by conduit means and arranged to engaged when supplied with hydraulic fluid from said shift valve through said conduit means;
- a second friction element, said second friction element comprising:
- a servo piston, said servo piston being disposed in a bore in a manner to define a release chamber and an apply chamber, said servo piston having a first pressure responsive area exposed to said release chamber and a second pressure responsive area exposed to said apply chamber, said first area being larger than said second area, said release chamber being fluidly communicated with said shift valve by said conduit means, said servo piston being arranged to produce a first pressure modifying effect on the pressure prevailing in said release chamber as it strokes from an engaged position to a released one against the bias of the hydraulic fluid pressure which is supplied to said apply chamber;
- an accumulator, said accumulator being fluidly communicated with said shift valve by said conduit means, said accumulator being arranged to produce a second pressure modifying effect on the pressure prevailing in said release chamber as it charges with hydraulic fluid, said first friction element and said accumulator being so constructed and arranged so that when the load on said transmission is high and low, the first pressure modifying effect occurs respectively before and after said second pressure adjusting effect.

9. In a transmission
- a shift valve, said shift valve having a port which is supplied with hydraulic fluid when said valve assumes a first position and which is drained when said valve assumes a second position;
- a first friction element, said first friction element being fluidly communicated with the port of said shift valve by conduit means and arranged to engaged when supplied with hydraulic fluid from said shift valve through said conduit means;
- a second friction element, said second friction element comprising:
- a servo piston, said servo piston being disposed in a bore in a manner to define a release chamber and an apply chamber, said servo piston having a first pressure responsive area exposed to said release chamber and a second pressure responsive area exposed to said apply chamber, said first area being larger than said second area, said release chamber being fluidly communicated with the port of said said shift valve by said conduit means, said servo piston being arranged to produce a first pressure adjustment effect on the pressure prevailing in said release chamber as it strokes from an engaged position to a released one against the bias of the hydraulic fluid pressure which is supplied to said apply chamber;
- an accumulator, said accumulator being fluidly communicated with the port of said shift valve by said conduit means, said accumulator having an accumulator piston which is arranged to stroke in a charging direction to produce a second pressure adjustment effect on the pressure prevailing in said release chamber as the accumulator fills with hydraulic fluid, said accumulator piston being exposed to a back pressure chamber; and a pressure control valve, said pressure control valve being responsive to the load on said transmission in a manner to modify the level of the pressure supplied to said back pressure chamber and to modify the bias which resists the stroking of said piston in said charging direction.

10. In a transmission a source of line pressure;

a source of throttle pressure which varies with the load on said transmission;

a first friction element which when engaged conditions said transmission to produce a nth gear ratio;

a second friction element which when engaged produces a n-1th gear ratio, said second friction element being disengaged to permit said transmission to produce said nth gear ratio, said second friction element having an apply chamber, a release chamber, a servo piston exposed to both of said apply and release chambers and a first spring disposed in said release chamber, said apply and release chambers being arranged so that when said release chamber is supplied with line pressure, said servo piston is moved toward a released position irrespective of the supply of line pressure into said apply chamber, a shift valve, said shift valve being fluidly communicated with said source of line pressure and with said first friction element and said release chamber;

an accumulator, said accumulator being fluidly commuicated with said release chamber, said accumulator having an accumlator piston which is disposed in a stepped bore in manner to define a working chamber and a back pressure chamber, said accumulator including a spring which is disposed in said working chamber;

said second friction element and said accumulator being so constructed and arranged so that when the load on said transmission is high and line pressure is supplied from said shift valve to said first friction element, the release chamber of said second friction element and the working chamber of said accumulator, the servo piston strokes toward its released position before the accumulator piston strokes under the filling of said working chamber, and so that when the load on said transmission is low and line pressure is supplied to said first friction element, the release chamber of said second friction element and the working chamber of said accumulator, the accumulator piston strokes under the filling of said working chamber before said servo piston strokes toward its released position, the stroking of said servo piston and said accumulator piston producing first and second pressure modifying effects respectively.

* * * * *